United States Patent
Pickrell et al.

(10) Patent No.: US 7,567,742 B2
(45) Date of Patent: Jul. 28, 2009

(54) HOLEY OPTICAL FIBER WITH RANDOM PATTERN OF HOLES AND METHOD FOR MAKING SAME

(75) Inventors: Gary Pickrell, Blacksburg, VA (US); Daniel Kominsky, Blacksburg, VA (US); Roger Stolen, Blacksburg, VA (US); Jeong I. Kim, Suwon (KR); Anbo Wang, Blacksburg, VA (US); Ahmad Safaai-Jazi, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 11/929,058

(22) Filed: Oct. 30, 2007

(65) Prior Publication Data

US 2008/0056657 A1    Mar. 6, 2008

Related U.S. Application Data

(63) Continuation of application No. 10/863,805, filed on Jun. 9, 2004, now Pat. No. 7,444,838.

(60) Provisional application No. 60/515,447, filed on Oct. 30, 2003.

(51) Int. Cl.
*G02B 6/032* (2006.01)
*G01J 1/04* (2006.01)
*C03B 37/023* (2006.01)

(52) U.S. Cl. .................. 385/125; 385/123; 385/141; 385/12; 385/13; 250/227.11; 250/227.14; 65/385; 65/401

(58) Field of Classification Search .................. 385/12, 385/123, 122, 124, 125, 126, 127, 141, 144, 385/142, 13, 128, 143, 145; 65/385, 399, 65/388–382, 394–398, 400–401, 413–435; 250/227.11, 227.16, 227.14, 227.18
See application file for complete search history.

(56) References Cited

U.S. PATENT DOCUMENTS 5,191,206 A    3/1993    Boiarski et al. ........ 250/227.14

(Continued)

FOREIGN PATENT DOCUMENTS

EP    1564569    8/2005    ............. 385/125 X (Continued)

OTHER PUBLICATIONS

Kominsky et. al., Optics Letters, vol. 28, No. 16, Aug. 15, 2003, pp. 1409-1411.*

(Continued)

*Primary Examiner*—Brian M Healy
(74) *Attorney, Agent, or Firm*—Blank Rome LLP (57) ABSTRACT

A random array of holes is created in an optical fiber by gas generated during fiber drawing. The gas forms bubbles which are drawn into long, microscopic holes. The gas is created by a gas generating material such as silicon nitride. Silicon nitride oxidizes to produce nitrogen oxides when heated. The gas generating material can alternatively be silicon carbide or other nitrides or carbides. The random holes can provide cladding for optical confinement when located around a fiber core. The random holes can also be present in the fiber core. The fibers can be made of silica. The present random hole fibers are particularly useful as pressure sensors since they experience a large wavelength dependant increase in optical loss when pressure or force is applied.

75 Claims, 5 Drawing Sheets

U.S. PATENT DOCUMENTS

| | | | |
|---|---|---|---|
| 5,627,921 A * | 5/1997 | Lidgard et al. | 385/12 |
| 5,802,236 A | 9/1998 | DiGiovanni et al. | 385/127 |
| 6,355,587 B1 | 3/2002 | Loxley et al. | 501/54 |
| 6,418,258 B1 * | 7/2002 | Wang | 385/125 |
| 6,539,155 B1 * | 3/2003 | Broeng et al. | 385/125 |
| 6,614,974 B2 | 9/2003 | Elrefaie et al. | 385/125 |
| 6,671,442 B2 | 12/2003 | Wang et al. | 385/125 |
| 6,687,445 B2 | 2/2004 | Carter et al. | 385/127 |
| 6,705,126 B2 * | 3/2004 | Paek et al. | 65/395 |
| 6,766,088 B2 | 7/2004 | Hasegawa et al. | 385/129 |
| 6,773,825 B2 | 8/2004 | Pickrell et al. | 428/566 |
| 6,795,635 B1 | 9/2004 | Fajardo et al. | 385/140 |
| 6,904,215 B2 | 6/2005 | Christoff et al. | 385/124 |
| 6,931,188 B2 * | 8/2005 | Kersey et al. | 385/125 |
| 7,039,284 B2 | 5/2006 | Nakahara et al. | 385/125 |
| 7,054,513 B2 | 5/2006 | Herz et al. | 385/12 |
| 7,072,552 B2 | 7/2006 | Manyam et al. | 385/125 |
| 7,099,552 B1 | 8/2006 | Oron et al. | 385/139 |
| 7,142,758 B1 | 11/2006 | Herz et al. | 385/125 |
| 7,174,078 B2 | 2/2007 | Libori et al. | 385/125 |
| 7,444,838 B2 * | 11/2008 | Pickrell et al. | 65/435 |
| 2004/0069019 A1 | 4/2004 | Carter et al. | 65/414 |
| 2004/0071423 A1 * | 4/2004 | Libori et al. | 385/127 |
| 2004/0258353 A1 | 12/2004 | Gluckstad et al. | 385/28 |
| 2005/0094954 A1 * | 5/2005 | Pickrell et al. | 385/123 |
| 2005/0111805 A1 | 5/2005 | Hertz et al. | 385/125 |
| 2006/0034574 A1 | 2/2006 | Guan et al. | 385/125 |
| 2007/0104437 A1 * | 5/2007 | Bookbinder et al. | 385/125 |
| 2008/0056657 A1 * | 3/2008 | Pickrell et al. | 385/125 |

FOREIGN PATENT DOCUMENTS

| | | | |
|---|---|---|---|
| EP | 1617243 | 1/2006 | 385/125 X |
| WO | WO-02/075393 | 9/2002 | 385/125 X |
| WO | WO-02/102730 | 12/2002 | 385/125 X |

OTHER PUBLICATIONS

Monro et. al., Optics Letters, vol. 25, No. 4, Feb. 15, 2000, pp. 206-208.*

Monro et al., "Holey Fibers with Random Cladding Distributions," Optic Letters, vol. 25, No. 4; Feb. 15, 2000, pp. 206-208.

Baggett, Joanne C. et al., "Improving Bending Losses in Holey Fibers," Optical Fiber Communication conference, 2005. Technical Digest. OFC/NFOEC, Mar. 6-11, 2005, vol. 3, 3 pp.

Ellis, Federick P.K., "Fabrication of Random Hole Optical Preforms by Silica Sol-Gel Processing," Thesis to be submitted to Virginia Polytechnic Institute and State University, Feb. 19, 2004, 34 pp.

Guan, N. et al, Characteristics of Field Confined Holey Fiber Analyzed by Boundary Element Method. OFC 2002, Mar. 17-22, 2002, pp. 525-527.

Holton, Carvel et al., "Colloidal Quantum Dots Entrained in Microstructured Optical Fibers," Proceedings of SPIE, 2004, vol. 5335, pp. 258-265.

Kominsky, Daniel, "Development of Random Hole Optical Fiber and Crucible Technique Optical Fibers," Dissertation submitted to Virginia Polytechnic Institute and State University, Sep. 6, 2005, 142 pp.

Kominsky, D. et al, "Generation of Random-Hole Optical Fiber," Optics Letters, Aug. 15, 2003, vol. 23, No. 16, pp. 1409-1411.

Monro, Tanya M. et al, "Holey Fibers with Randomly Arranged Air Holes," Conference on Lasers and electro-Optics, 2000 (CLEO 2000), pp. 607-608.

Monro, Tanya M. et al, "New Possibilities with Holey Fibers," Optical Fiber Communication Conference, 2000, vol. 3, pp. 106-108.

Pickrell, Gary et al., Fiber Optic Chemical Sensing, proceedings of SPIE, vol. 5998, Nov. 5, 2005, 15 pp.

Pickrell, Gary et al., "New Fabrication for Random-Hole Optical Fibers," Proceedings of SPIE—The International Society for Optical Engineering, vol. 5589, Fiber Optic Sensor Technology and Applications III, Oct. 26-28, 2004, pp. 257-256.

Pickrell, Gary, et al., "Random-Hole Optical Fiber Evanescent-Wave Gas Sensing," Optics Letters, Jul. 1, 2004, vol. 29, No. 13, pp. 1476-1478.

Pickrell, Gary R., et al, "Random Hole Optical Fibers," Proceedings of SPIE, Industrial and Highway Sensors Technology, 2003, vol. 5272, pp. 207-215.

Richardson, D.J. et al., "Advances in Microstructured Fiber Technology," proceedings of 2005 IEEE/LEOS Workshop on Fibers and Optical Passive Components, Jun. 22-24, 2005, pp. 1-9.

Shinohara, Hiromichi, "Broadband Access in Japan: Rapidly Growing FTTH Market," IEEE Communications magazine, Sep. 2005, pp. 72-78.

Bing, Y. et al., "Low-Loss Holey Fiber," Hitachi Cable Review No. 24, Aug. 2005, pp. 1-5.

Matsuo, S., et al., "Bend-Insensitive and Low-Splice-Loss Optical Fiber for Indoor Wiring in FTTH," Optical Fiber Communication Conference, 2004, Feb. 23-27, 2004, vol. 2, 3 pgs. with descriptive sheet attached.

Wu, Tzong-Lin et al., "A Novel Ultraflatened Dispersion Photonic Crystal Fiber," IEEE Photonics Technology Letters, Jan. 2005, vol. 17, No. 1, pp. 67-69.

Pickrell, G., Kominsky, D., Stolen, R. et al. "Microstructural analysis of Random Hole Optical Fibers," IEEE Photonics Technology Letters, vol. 16, No. 2, Feb. 2004, pp. 491-493.

Pickrell, G., et al., "Novel Techniques for the Fabrication of Holey Optical Fibers," Fiber Optic Sensor Technology and Applications, Proceedings of SPIE, vol. 4578 (2002), pp. 271-282.

* cited by examiner

HOLEY OPTICAL FIBER WITH RANDOM PATTERN OF HOLES AND METHOD FOR MAKING SAME

CROSS-REFERENCE TO RELATED APPLICATIONS

The present application is a continuation of U.S. patent application Ser. No. 10/863,805, now U.S. Pat. No. 7,444,838, filed Jun. 9, 2004, which claims the benefit of priority from provisional application 60/515,447, filed on Oct. 30, 2003. The disclosures of both of those applications are hereby incorporated by reference in their entireties into the present disclosure.

FIELD OF THE INVENTION

The present invention relates generally to holey optical fibers and methods for making holey optical fibers. More specifically, the present invention relates to a new technique for making holey optical fibers having random patterns of holes. In the present method, a gas-generating material included in the fiber preform forms the holes as the fiber is drawn.

BACKGROUND OF THE INVENTION

Holey optical fibers have microscopic holes or voids for guiding light. In holey fibers, the core is solid (e.g. SiO2) and is surrounded by an array of holes containing inert gas or air. The light guided in the optical fiber may be confined to the central core region by one of two basic mechanisms. In the first mechanism, light is confined to the central core region by a refractive index difference between the core and cladding material. In conventional solid glass fibers, the refractive index difference is produced by dopants in either the core or cladding material in order to raise or lower the refractive indices of these regions. In general it is desired for the core region to have a higher refractive index than the cladding region. This can either be accomplished by doping materials such as germanium or similar elements in the core to raise the index or doping fluorine or similar in the cladding region to lower the refractive index. The index of the cladding region can also be lowered by introducing porosity in that region. The microscopic holes have a much lower refractive index compared to the solid core, so light is confined to the core. In the second type of confinement mechanism, the size and spacing of the holes is controlled in a very uniform and well defined pattern such that a photonic band gap is produced. The holes must be periodically spaced and carefully arranged and maintained in the fiber to achieve the photonic band gap effects. These fibers are often referred to as photonic crystal fibers owing to their period arrangement of air holes in the fiber. The microscopic holes provide unusual optical properties such as single-mode operation over a wide wavelength range, low zero-dispersion wavelength, and highly controllable birefringence. As a result, holey optical fibers are expected to have a wide range of applications in optical sensors and telecommunications.

Holey optical fibers are conventionally manufactured by stacking an array of hollow silica tubes to form a preform. The tubes are carefully arranged to control the spacing between them and to ensure the crystalline arrangement. The preform is then heated and drawn into fibers as known in the art. The tubes generally experience a uniform scale reduction during drawing so that the tubes create the microscopic holes in the fiber.

One of the drawbacks of the conventional method for making holey optical fibers is the complexity of assembling the stack of tubes. Also, the tube-stacking method cannot be used to produce fibers with random arrays of holes.

SUMMARY OF THE INVENTION

The present invention includes an optical fiber having a holey region with a random array of holes. In the present invention, the holes are created by gas generated during fiber drawing.

The holey region can be disposed around a fiber core, so that the holey region functions as a cladding.

The gas can be generated by nitride or carbide compounds. Silicon nitride and silicon carbide are exemplary gas generating materials. Carbides will typically produce carbon monoxide or carbon dioxide gas by decomposition and oxidation of carbon.

The holes may be filled with the gas generated during fiber drawing. The gas may be nitrogen, carbon monoxide, carbon dioxide or mixed nitrogen oxides, for example.

The random holes can have a uniform or nonuniform hole distribution.

The present invention includes a method for making the present random hole optical fiber. In the method, a preform contains the gas generating material that produces gas bubbles when heated. The preform is heated and drawn so that the gas bubbles are drawn into long holes. The preform may comprise a glass powder mixed with the gas generating material.

The gas generating material may be provided in the form of a liquid precursor. The liquid precursor may convert to a nitride or carbide material when heated.

Oxygen may be provided to the interior of the fiber preform so that the gas generating material is exposed to oxygen as it is heated.

The present invention includes a pressure sensor or force sensor having the present random hole optical fiber. The present random hole optical fiber exhibits increased optical loss when in response to applied pressure or force. Hence, the random hole fiber can be used as a pressure or force sensor by monitoring optical loss in the fiber.

DETAILED DESCRIPTION OF THE PREFERRED EMBODIMENT OF THE INVENTION

The present invention provides a holey optical fiber with a random array of holes. In the present invention, the holey optical fiber is made by including a gas-generating material in the fiber preform. In a typical embodiment, the gas generating material is located around a solid core (e.g., made of solid SiO2). The gas generating material may be a nitride ceramic (e.g., silicon nitride, rare earth nitrides, AlN, TiN) or carbide ceramic (e.g. silicon carbide, rare earth carbides) that decomposes at or close to the fiber drawing temperature (e.g., 1500-1600 Celsius in the case of pure fused silica fibers). Decomposition produces gas bubbles (e.g., $N_2$, $CO_2$, carbon monoxide or nitrogen oxides) in the molten preform material as it is drawn. The gas bubbles are randomly distributed and are drawn into long thin holes (or tubes) that remain in the optical fiber. The holes reduce the refractive index in the region surrounding the solid core, and so provide light confinement. The number and size of the holes can be influenced by the preform composition, drawing temperature, parent material particle size and drawing speed, among other factors. Though the holes have random locations, they can have nonuniform distribution by nonuniformly distributing the gas generating material.

Figures 1, 2:
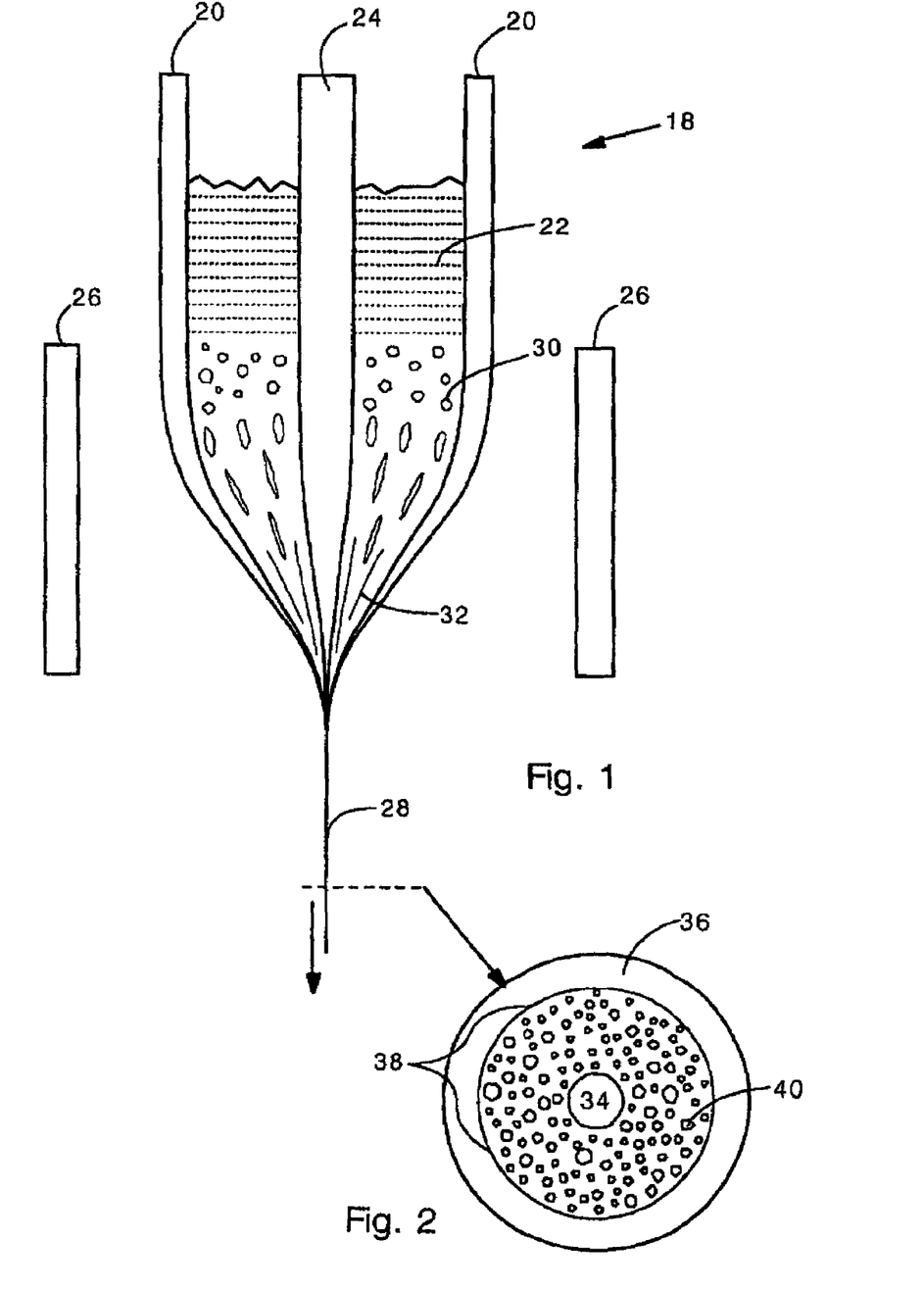
FIG. 1 illustrates the present method for making random hole optical fiber.
FIG. 2 shows a cross-sectional view of a random hole optical fiber.

FIG. 1 illustrates the present method for making random-hole optical fiber. In the present method, a fiber preform 18 comprises a silica tube 20 filled with a holey region forming powder 22 and a solid silica rod 24. The holey region forming powder 22 forms a fiber cladding and the solid rod 24 forms a fiber core.

Heaters 26 heat the preform 18 so that it can be pulled to form a fiber 28, as known in the art.

The holey region forming powder 22 comprises a mixture of a glass material (e.g., high purity silica powder) and a gas-generating material (e.g., silicon nitride). The gas generating material produces a gas when heated above the sintering temperature of the glass material. The gas generating material can produce gas by thermal decomposition or by chemical reactions (e.g. oxidation) with other components of the holey region forming powder, for example. The gas generated within the holey region forming powder 22 forms trapped bubbles 30 as the holey region forming powder 22 sinters and softens. The bubbles 30 are stretched and drawn into elongated tubes 32 as the fiber 28 is pulled. In preferred embodiments, the glass material is silica, and the gas generating material is a nitride or carbide ceramic.

FIG. 2 shows a magnified, cross sectional view of the present random hole optical fiber. The fiber has a core 34 formed from the solid rod 24, and a solid covering 36 formed from the tube 20. A holey region 38 provides a cladding around the core 34. The holey region is formed from the holey region forming powder 22 and contains a large number (e.g., >50 or >200) of holes 40. The holes 40 are created from the bubbles 30. The holes 40 are preferably long tubes that may be centimeters, meters, or kilometers long, for example, depending upon the size of the starting bubble in the preform and the additional gas generated (if any) during the drawing of the bubble into the tube. The holes will typically have finely tapered ends, such that the diameter of the tube will reduce in size gradually as it reaches the end. The holes may have typical diameters of 0.01-5 microns, for example, and may be even smaller at the ends. The holes can be as large as tens of microns. The holes typically lack continuity, but new ones form as old ones end so that the holey region 38 has a relatively constant porosity. The holes 40 are filled with gas and so tend to reduce the average refractive index of the cladding region 38. As a result, optical energy will be confined within the core 34 as known in the art. In preferred embodiments, the holes 40 are smaller than a wavelength of light in the fiber core, so that optical energy is minimally perturbed by individual bubbles 40. Very small holes (e.g., less than 100 nm in diameter) may be required in applications where perturbation of the optical energy is undesirable.

The holey region forming powder 20 comprises mostly glass material (e.g., high purity silica powder) with a portion of a gas generating material. The gas generating material is preferably a ceramic (e.g., nitride or carbide) that generates gas at or close to the temperature required for fiber drawing. For example, the gas generating material can generate gas at temperatures in the range of about 1000-1600° C. for silica fibers. The gas generating material should generate gas at temperatures above the sintering temperature of the holey region forming powder so that generated gas is trapped and cannot escape. The gas can be generated by decomposition and/or oxidation, for example. The gas that forms the bubbles 30 can be any gas, but is preferably a relatively inert gas that does not interfere with desired light transmission properties of the optical fiber.

In a preferred embodiment, the gas generating material is silicon nitride. The silicon nitride can be a powder mixed into the holey region forming powder 22. Alternatively, the silicon nitride can be a coating on the particles of glass material. Silicon nitride is a preferred material for generating the gas bubbles 30 because it produces a relatively large amount of gas at the drawing temperature, and because it oxidizes to SiO2 (a preferred fiber material) during drawing. Silicon nitride is a preferred gas generating material when silica is the glass material.

Silicon nitride can be present in amounts less than about 1% by weight of the holey region forming powder when the balance is silica. In optical fibers manufactured by the present inventors, silicon nitride comprises about 0.01-0.5%, or, more typically, 0.04-0.1% of the holey region forming powder by weight, with the balance of the holey region forming powder being high purity silica. The amount of silicon nitride will influence the porosity of the holey region. Larger amounts of silicon nitride will tend to produce higher porosity, and hence, a relatively lower average refractive index in the holey regions.

The porosity of the holey region can vary widely. For example, the present invention can produce porosities from less than 1% to 95% and higher. Low porosities can be used in the cladding region of index-guiding fiber. High porosities can be used to reduce optical loss from Rayleigh scattering, for example.

While not wishing to be limited to a specific mechanism, it is believed by the present inventors that silicon nitride produces gas by oxidation during drawing. Oxygen present in the holey region forming powder oxidizes the silicon nitride, producing $SiO_2$, and nitrogen or nitrogen oxides or some mixture thereof. Oxygen might also oxidize the nitrogen to form mixed nitrogen oxides. The oxygen may be adsorbed on the surfaces of holey region forming powder particles, may be trapped in voids during sintering, or may be dissolved in the silica. Oxygen bound to silica may also contribute to the oxidation. The nitrogen and nitrogen oxide gases may remain in the holes of the final, drawn fiber.

It is noted that oxygen or other gases (e.g., inert gases) may be incorporated into the holey region forming powder during drawing. For example, flowing oxygen gas into the holey region forming powder may increase the oxidation of the silicon nitride and gas generation. The fiber preform can also be filled with ambient air. Solid oxygen sources (e.g., nitrates) can also be incorporated into the holey region forming powder.

The holey region forming powder can have a wide range of particle sizes. Typical fibers made by the present inventors have employed 325 mesh and 100 mesh silica powder and sub-micron diameter silicon nitride powder. Other particle sizes can also be used and may influence the size of the holes 40 or porosity of the holey region. The size of the powder particles can affect the sintering temperature and amount of gas generated. If mixtures of powders are used, they should be thoroughly mixed before drawing, unless non-uniform hole distributions are desired.

It is noted that pre-oxidation of the gas generating material, drawing speed, pulling force and drawing temperature may also influence the porosity of the holey regions or the size of the holes.

The glass material of the holey region forming powder is preferably high purity silica. However, other glassy materials can be used instead. For example, fluoride-containing glasses, borosilicate glasses, or other optical glasses can be used instead of silica. These other glasses may require different drawing conditions (e.g. different temperatures, absence of oxygen) and so may require use with specific gas generating materials.

Silicon carbide can also be used as the gas generating material. Silicon carbide tends to oxidize in the presence of oxygen at high temperature, forming $SiO_2$ and carbon monoxide or carbon dioxide. The carbon monoxide or carbon dioxide provides the bubbles 30. The oxygen source can be elemental oxygen present in the preform. Pure gaseous oxygen can be flowed into the preform to increase the amount of available oxygen. However, it has been empirically observed that silicon carbide tends to form less gas than silicon nitride, on a weight percentage basis. For this reason, the holey region forming powder may require more than 1% by weight silicon carbide (e.g., 1-5%) for adequate gas generation, when combined with silica. Of course, the required amount of silicon carbide depends upon the desired porosity and application of the optical fiber.

Many materials other than silicon nitride and silicon carbide can be used as the gas generating material. It is noted that, in general, the gas generating material should have the following characteristics:

1) The gas generating material should produce gas at a temperature at or above the sintering temperature of the holey region forming powder. If the gas generating material produces all of its gas at a temperature below the sintering temperature of the powder, then gas will not be trapped within the preform, and bubbles will not be formed. Sintering temperature will be affected by heating duration, particle size, particle compaction, and particle surface chemistry. For example, 325 mesh silica powder typically can be sintered at about 1000-1500 Celsius. Silicon nitride is suitable for use with silica because it continues to produce gas at typical silica sintering temperatures.

2) The gas generating material should produce gases that do not impair desired optical properties of the optical fiber. In many cases, and depending upon the application, the reaction products of the gas generating material must not exhibit too high of optical losses to the propagating signal. Silicon nitride meets this guideline because the nitrogen, nitrogen oxides and $SiO_2$ do not interfere with optical transmission significantly in most of the wavelength regions of interest (e.g., optical and near-infrared).

It is noted that many nitride materials can be used as the gas-generating material. Examples of possible nitride materials that can be used include aluminum nitride, titanium nitride, rare earth metal nitrides (e.g. erbium nitride, nyodimuim nitride), and boron nitride. Other metal nitrides or intermetallic nitrides can also be used. Metal nitrides and intermetallic nitrides tend to decompose at high temperature, or oxidize in the presence of oxygen, thereby forming gas bubbles of nitrogen or nitrogen oxides.

Also, many carbide materials can be used as the gas generating material. Carbide materials that can be used include aluminum carbide, titanium carbide, rare earth carbides and other metal or intermetallic carbides. Carbide materials tend to decompose and oxidize into carbon dioxide and carbon monoxide in the presence of oxygen.

Also, nitrate and carbonate compounds may be used as the gas generating material. The nitrate or carbonate material should be a metal compound. For example, sodium nitrate or sodium carbonate can be used. Nitrates will form nitrogen, nitrogen oxides, and possibly oxygen; carbonates will form carbon dioxide, carbon monoxide and possibly oxygen. The nitrate or carbonate material can be added to the preform as a powder, or an aqueous solution, for example. Other nitrates or carbonates that can be used include potassium nitrate or carbonate, rare earth nitrates and carbonates, and aluminum nitrate or carbonate.

Rare earth metal nitrides, carbides, nitrates and carbonates, in addition to providing gas bubbles, can provide rare earth dopants (e.g., erbium, neodymium, etc.) or other dopants with desirable optical functions such as optical amplification, fluoresence or frequency shifting. Other dopants can also be incorporated into the fiber. Useful optical properties of rare earth dopants and other dopants are known in the art.

It is also noted that rare earth dopants or other dopants can be incorporated into the holey region forming powder as dopants in the glass material.

In another aspect of the invention, a liquid precursor material is used to provide the gas generating material. The liquid precursor can decompose with heating to produce carbides or nitrides that subsequently release bubble-forming gas. In this embodiment, the liquid precursor is mixed with glass powder to form the holey region forming powder. The holey region forming powder will be a slurry or paste in this embodiment. The liquid precursor can be a polysilizane (e.g. polyureasilizane), alumoxane, or polyurethane, or other suitable liquid as know in the art to produce solid compounds that generate gases when heated. Specifically, these liquid materials are known to form nitrides and carbides when heated. The choice of liquid precursor will in general be subject to the considerations addressed above, including decomposition temperature, gases produced and resulting oxidation processes. An advantage of using a liquid precursor is that the liquid forms coatings or particles of gas generating material with extremely high uniformity. For example, the liquid precursor may form a thin coating of gas generating material on each particle of glass material in the holey region forming powder. A coating on each particle will tend to produce more uniform distribution of gas generating material compared to a mixture of particles. A highly uniform distribution of gas generating material will tend to create a highly uniform distribution of holes, and holes with smaller sizes. Uniform hole distribution and small hole size are typically preferred in optical fiber applications.

Figure 3:
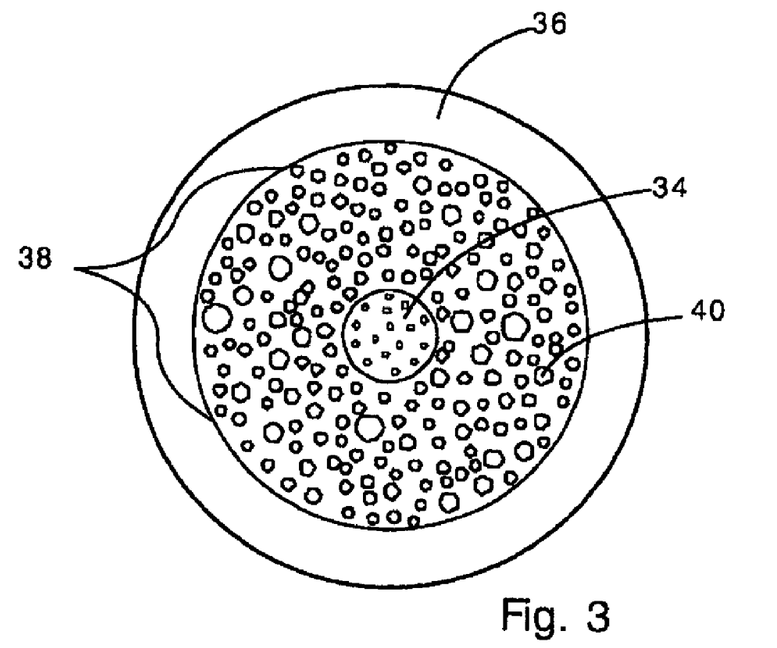
FIG. 3 shows a cross-sectional view of a fiber having random holes in the core.

To control the amount of gas generating material created by the liquid precursor, the liquid precursor can be diluted with a solvent. A highly diluted liquid precursor material will tend to produce fewer bubbles and lower porosity in the optical fiber. Solvents that can be used include alcohol, chlorinated hydrocarbons, acetates, ethers, etc., depending upon the liquid precursor used, with different solvents being suitable for different precursors, as known in the art. 4h FIG. 3 shows an alternative optical fiber that has holes in the core region 34. This fiber can be made by replacing the solid rod 24 of FIG. 1 with a column of glass powder having a lower concentration of gas generating material. The glass powder can be disposed within a hollow tube so that it has a well defined diameter. The hollow tube could be made of glass and remain during the draw or could be withdrawn before the fiber drawing occurs so that the tube is not incorporated into the fiber. Alternatively, the tube could be made from a thin polymeric material that vaporizes at low temperature. A possible advantage of providing holes in the core region is that it could reduce Rayleigh scattering and optical loss by minimizing the amount of glass material in the core. In order to reduce Rayleigh scattering as much as possible, high porosities may be desirable. For example, the core may have a 97% porosity and the cladding a 98% porosity.

Figure 4:
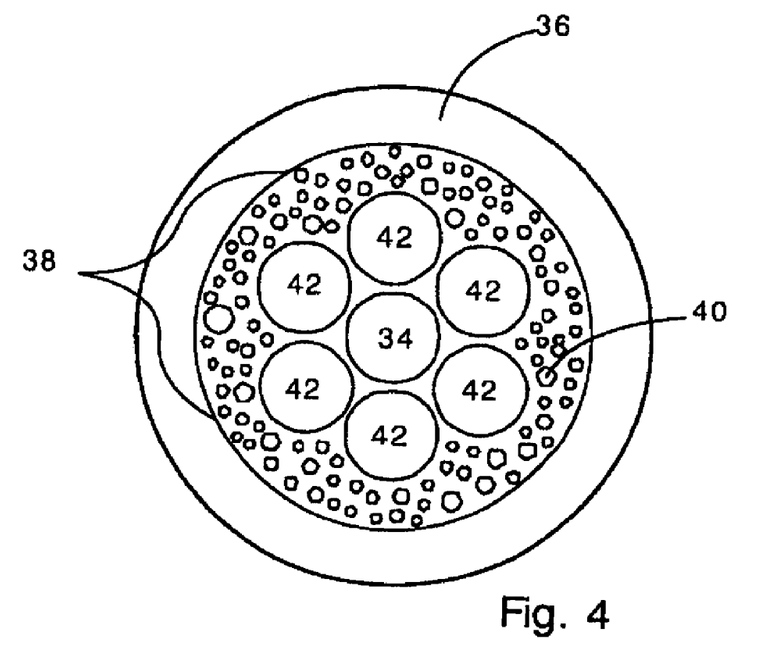
FIG. 4 shows a cross sectional view of a fiber having random holes in combination with holes made from stacked tubes.

Many other fiber structures are also possible in the present invention. FIG. 4, for example, shows a cross-section of an optical fiber with random holes generated by gas 40, in combination with an organized array of six holes 42 formed from drawn hollow glass tubes. This embodiment can be created by stacking six hollow glass tubes around the solid rod 34 in the preform of FIG. 1, as known in the conventional art of making holey fibers. The space around the tubes is filled with holey region forming powder.

Figure 5:
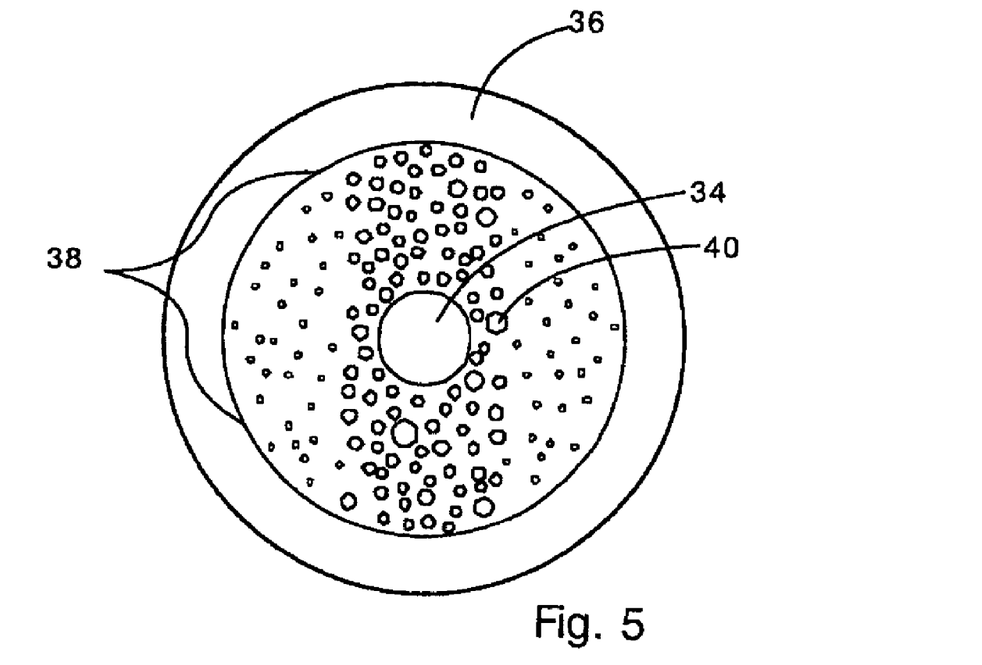
FIG. 5 shows a cross sectional view of a fiber having a non-uniform distribution of random holes.

FIG. 5 shows a cross-section of an optical fiber with a non-uniform distribution of random holes 40. The fiber of FIG. 5 may have strong birefringence and may have useful polarization maintaining properties. The fiber of FIG. 5 can be made by non-uniformly distributing gas generating material in the preform. Alternatively, the fiber of FIG. 5 can be made by including large D-shaped solid glass rods in the preform.

Figure 6:
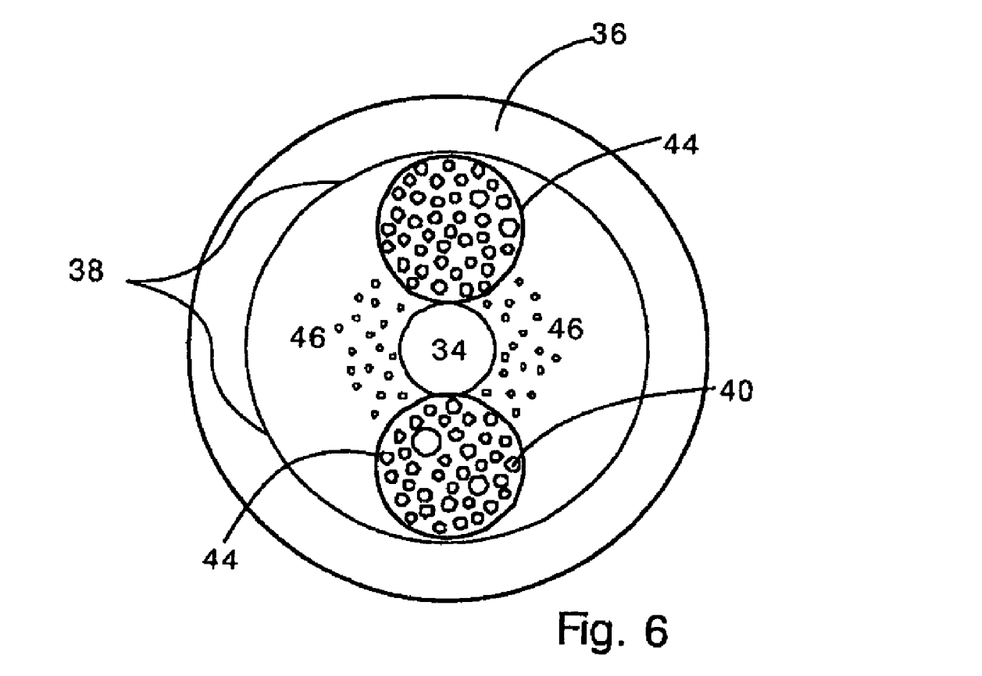
FIG. 6 shows a cross sectional view of a fiber having a non-uniform distribution of random holes in which the random holes are confined by hollow tubes.

FIG. 6 shows another embodiment of the invention in which holey regions are confined within two drawn hollow glass tubes 44. Areas 46 outside the tubes 44 may be created from glass powder lacking gas generating material or having a smaller amount of gas generating material. The fiber of FIG. 6 can be made by packing tubes 44 with holey region forming powder before drawing.

It is noted that many different fiber structures can be made by combining gas generating powder with glass powder, hollow glass tubes, and solid glass tubes. Holey regions can be localized by disposing gas generating material within a hollow glass tube. Solid regions can be created from glass powder lacking gas generating material or from using solid glass elements. An infinite variety of structures are possible within the scope of the present invention.

The present random hole optical fibers are pressure sensitive and can be used in pressure and force sensing applications. Specifically, the random hole fiber experiences an increase in optical loss when pressure is applied in a direction orthogonal to the fiber axis, or when the pressure is hydrostatically applied.

The optical loss of the random hole fiber varies with wavelength. The loss is generally greater for relatively short wavelengths (e.g., wavelengths shorter than 600 nm) than for long wavelengths. However, the wavelength dependence of loss is complex and a function of the physical structure of the fiber.

The random hole fiber is sensitive to linear force, and to isotropic hydrostatic pressure applied by a fluid medium. A linear force can be applied by placing a weight on top of the fiber, for example.

Figure 7:
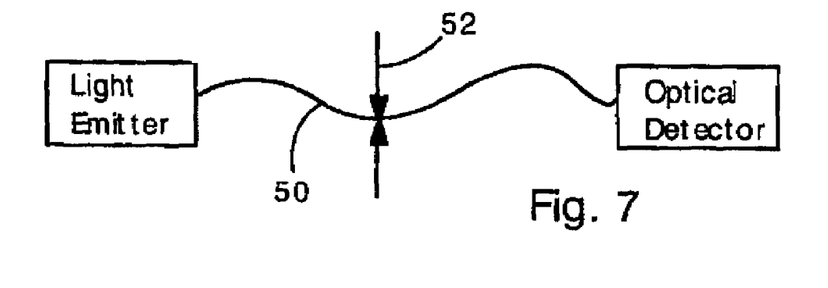
FIG. 7 shows a pressure sensor according to the present invention.

FIG. 7 shows a simple pressure sensor according to the present invention having a section of random hole optical fiber 50. The optical loss of the optical fiber is responsive to applied pressure 52. The applied pressure can therefore be determined by monitoring the loss of the fiber with an optical detector.

Figure 8:
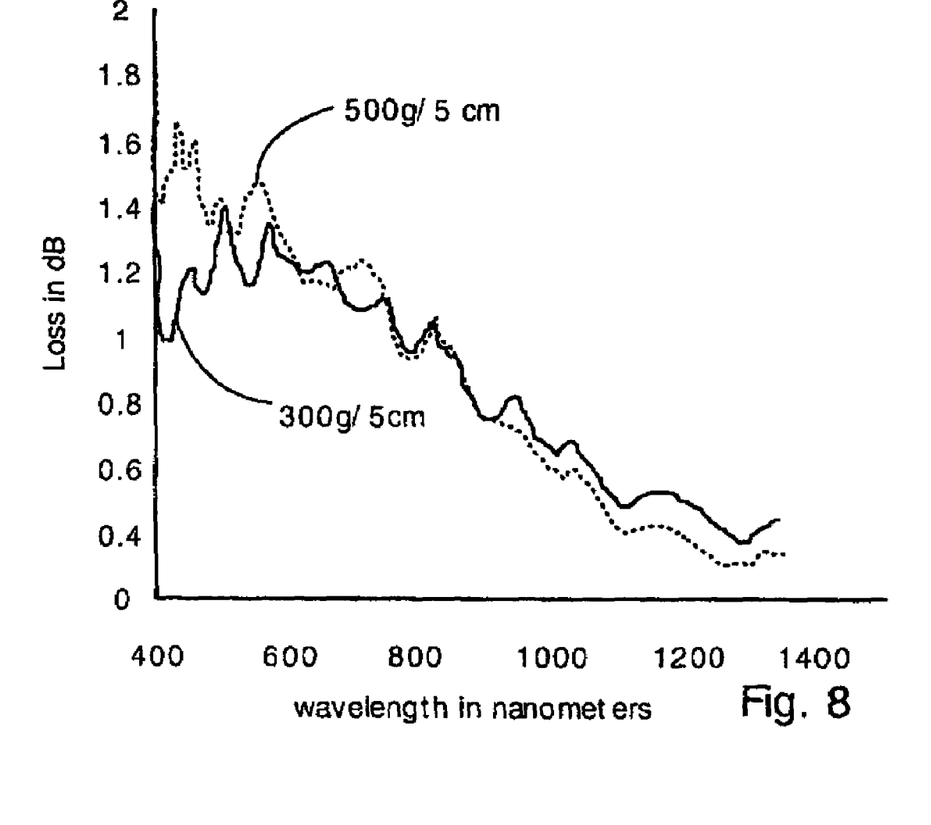
FIG. 8 shows plots of loss versus wavelength when 500 gram and 300 gram weights are rested on a random hole fiber.

FIG. 8 shows plots of optical loss as a function of wavelength for a random hole optical fiber. The fiber has a solid core and a holey cladding, like the fiber of FIG. 2. FIG. 8 illustrates the optical loss when a 300-gram weight rests on a 5 centimeter length of the fiber, and the optical loss when a 500-gram weight rests on a 5 centimeter length of the fiber. The optical loss increases substantially in the short wavelength (i.e. less than 600 nm) as the weight is increased. The optical loss continues to increase as the weight is increased beyond 500 grams, although this is not illustrated. Optical loss can be used to determine pressure or force applied to the fiber.

Figure 9:
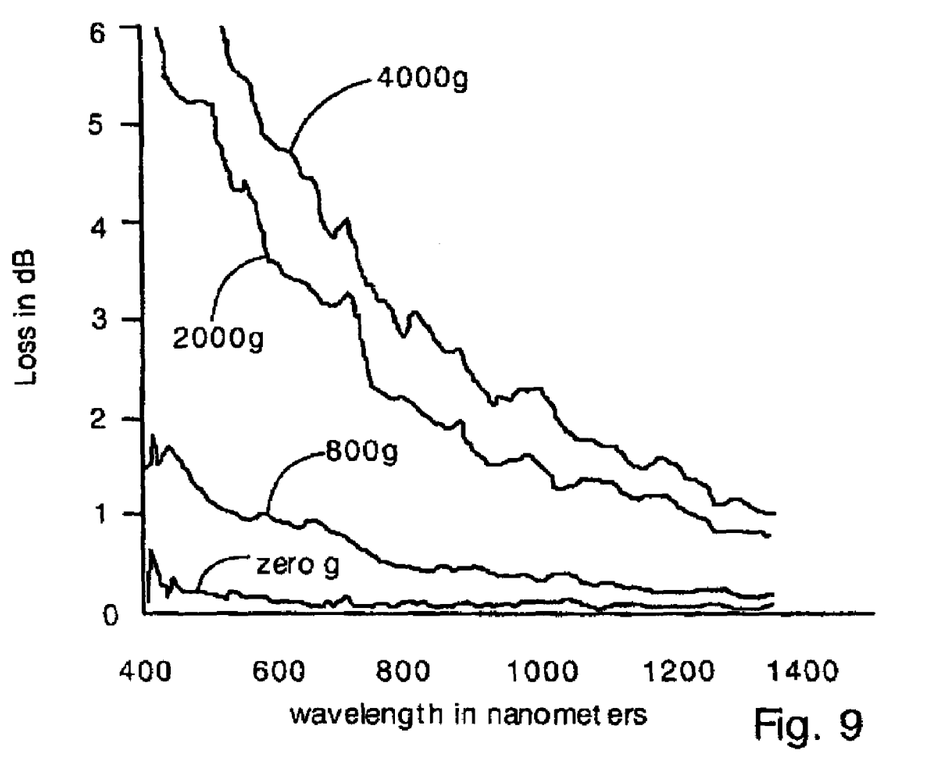
FIG. 9 shows plots of loss versus wavelength when 4000, 2000, and 800 gram weights are rested on a random hole fiber.

FIG. 9 shows plots of optical loss as a function of wavelength for a random hole fiber different from the fiber used to generate FIG. 8. The fiber used to generate FIG. 9 has a solid core and a holey cladding, like the fiber of FIG. 2. FIG. 9 illustrates the optical loss when 4000 g, 2000 g, and 800 g, weights rest on 2.85 centimeter lengths of the fiber. Also, the loss with zero pressure applied (zero weight) is also shown. From FIG. 9 it is clear that the optical loss increases dramatically with increasing pressure.

It is noted that the optical loss due to pressure or applied force is repeatable and does not exhibit hysteresis. Repeated tests confirm that applied pressure does not produce permanent alterations in the optical loss of the fiber. Also, it is noted that the optical loss is relatively insensitive to temperature changes. These features make the present random hole optical fibers ideal for applications in pressure and force sensing applications. Also, the relative lack of pressure sensitivity in the longer wavelengths provides a ready means for calibrating such a sensor, and providing self-calibration during operation.

Additionally, it is noted that the pressure measurement provided by optical loss variations is a distributed measurement. The optical loss is a function of the pressure magnitude in addition to the length of fiber experiencing the pressure.

While not wishing to be limited to a specific mechanism, it is believed that pressure induced loss in the random hole optical fibers is a result of stress induced birefringence, optical tunneling, or highly localized microbends. The random pattern of holes may create nonuniform structural deformation in the fiber, and therefore loss-inducing microbends.

The present random hole optical fiber can be used to sense force or pressure in a wide range of sensing applications. The fiber can be used to detect pressure by monitoring the amount of optical loss detected.

The present method for making random hole optical fiber provides several significant advantages including ease of fabrication, potential for continuous fiber drawing, and lower fabrication costs compared to convention techniques for making holey fiber.

It will be clear to one skilled in the art that the above embodiment may be altered in many ways without departing from the scope of the invention. Accordingly, the scope of the invention should be determined by the following claims and their legal equivalents.

What is claimed is:
1. An optical fiber, comprising:
a holey region with a random and non-uniform array of holes created by a gas generated during fiber drawing, wherein the random and non-uniform array of holes varies along a length of the optical fiber.

2. The optical fiber of claim 1, further comprising a solid core surrounded by the holey region.

3. The optical fiber of claim 1, wherein the gas generated during fiber drawing includes an oxidation product of silicon nitride.

4. The optical fiber of claim 1 wherein the holey region comprises a core and a cladding, and wherein the core has a lower porosity than the cladding.

5. The optical fiber of claim 1 wherein the holey region comprises a core of the optical fiber.

6. The optical fiber of claim 1 further comprising a hole formed from a drawn hollow glass tube.

7. The optical fiber of claim 1 further comprising a solid area surrounding the holey region.

8. The optical fiber of claim 1 wherein the gas is an oxidation product of a nitride material, a carbide material, a metal nitrate material or a metal carbonate material.

9. The optical fiber of claim 1 wherein the holes contain the gas generated during fiber drawing.

10. The optical fiber of claim 1 wherein the gas includes at least one of $N_2$, $CO_2$, carbon monoxide and nitrogen oxides.

11. The optical fiber of claim 1 further comprising an optical detector coupled to the fiber, operable for detecting pressure applied to the optical fiber.

12. The optical fiber of claim 1 wherein the holey region has a non-uniform hole distribution.

13. The optical fiber of claim 1 wherein the holey region is confined within a drawn hollow glass tube.

14. An optical fiber, comprising:
   a) a core;
   b) a cladding region surrounding the core, wherein the cladding region includes a random and non-uniform array of holes containing a gas, wherein the random and non-uniform array of holes varies along a length of the optical fiber.

15. The optical fiber of claim 14 further comprising a solid tube surrounding the cladding region.

16. The optical fiber of claim 14 wherein the gas is created from a gas generating material selected from the group consisting of nitrides, carbides, metal nitrates and metal carbonates.

17. The optical fiber of claim 14 wherein the gas includes at least one of $N_2$, $CO_2$, carbon monoxide, and nitrogen oxides.

18. The optical fiber of claim 14 wherein the core includes a plurality of holes containing a gas.

19. The optical fiber of claim 14 further comprising an optical detector coupled to the fiber, operable for detecting pressure applied to the optical fiber.

20. The optical fiber of claim 14 wherein the cladding region further comprises a hole formed from a drawn hollow glass tube.

21. The optical fiber of claim 14 wherein the holey region has a non-uniform hole distribution.

22. A pressure or force sensor, comprising:
   an optical fiber having a holey region with a random and non-uniform array of holes, wherein the holes are created by gas generated during fiber drawing, wherein the random and non-uniform array of holes varies along a length of the optical fiber; and
   an optical detector coupled to the optical fiber, operable for detecting pressure applied to the optical fiber.

23. The pressure sensor of claim 22, further comprising a light emitter coupled to the fiber so that the optical detector detects light emitted by the emitter and transmitted through the optical fiber.

24. The pressure sensor of claim 22, wherein the detector detects light with a wavelength in the range of 300-1700 nanometers.

25. The pressure sensor of claim 22, wherein the optical fiber comprises a solid core disposed within the holey region, so that the holey region functions as a cladding.

26. An optical fiber, comprising:
   a core; and
   a cladding region surrounding the core, wherein the cladding region includes a plurality of holes containing a gas, said holes varying in location along the axis of said fiber.

27. An optical fiber, comprising:
   a core; and
   a cladding region surrounding the core, wherein the cladding region includes a plurality of holes containing a gas, wherein the gas consists substantially of $N_2$.

28. An optical fiber, comprising:
   a core; and
   a cladding region surrounding the core, wherein the cladding region includes a plurality of holes containing a gas, wherein the gas consists substantially of $CO_2$.

29. An optical fiber, comprising:
   a core; and
   a cladding region surrounding the core, wherein the cladding region includes a plurality of holes containing a gas, wherein the gas consists substantially of carbon monoxide.

30. An optical fiber, comprising:
   a core; and
   a cladding region surrounding the core, wherein the cladding region includes a plurality of holes containing a gas, wherein the gas consists substantially of nitrogen oxides.

31. An optical fiber, comprising:
   a core; and
   a cladding region surrounding the core, wherein the cladding region includes a plurality of holes containing a gas, wherein the gas includes at least one of $N_2$, $CO_2$, carbon monoxide, and nitrogen oxides.

32. An optical fiber, comprising:
   a core; and
   a cladding region surrounding the core, wherein the cladding region includes a plurality of holes containing a gas, said holes varying in location along the axis of said fiber and said gas consists substantially of $N_2$.

33. An optical fiber, comprising:
   a core; and
   a cladding region surrounding the core, wherein the cladding region includes a plurality of holes containing a gas, said holes varying in location along the axis of said fiber and said gas consists substantially of $CO_2$.

34. An optical fiber, comprising:
   a core; and
   a cladding region surrounding the core, wherein the cladding region includes a plurality of holes containing a gas, said holes varying in location along the axis of said fiber and said gas consists substantially of carbon monoxide.

35. An optical fiber, comprising:
   a core; and
   a cladding region surrounding the core, wherein the cladding region includes a plurality of holes containing a gas, said holes varying in location along the axis of said fiber and said gas consists substantially of nitrogen oxides.

36. An optical fiber, comprising:
a core; and
a cladding region surrounding the core, wherein the cladding region includes a plurality of holes containing a gas, said holes varying in location along the axis of said fiber and said gas comprises at least one of $N_2$, $CO_2$, carbon monoxide, and nitrogen oxides.

37. A preform for forming an optical fiber, the preform comprising:
a tube of an optical material; and
a powder comprising the optical material and a gas-generating material, the powder being enclosed in the tube.

38. The preform of claim 37, further comprising a rod of the optical material surrounded by the powder.

39. The preform of claim 37, wherein the gas-generating material is a nitride, carbide, metal nitrate or metal carbonate.

40. A method for forming an optical fiber, the method comprising:
(a) providing a preform; and
(b) forming the optical fiber from the preform so as to form a holey region with a random and non-uniform array of holes, wherein the random and non-uniform array of holes varies along a length of the optical fiber.

41. The method of claim 40, wherein the holes contain a gas.

42. The method of claim 41, wherein the gas consists substantially of $N_2$.

43. The method of claim 41, wherein the gas consists substantially of $CO_2$.

44. The method of claim 41, wherein the gas consists substantially of carbon monoxide.

45. The method of claim 41, wherein the gas consists substantially of nitrogen oxides.

46. The method of claim 41, wherein the gas includes at least one of $N_2$, $CO_2$, carbon monoxide, and nitrogen oxides.

47. An optical fiber, comprising:
a core; and
a cladding region surrounding the core, wherein the cladding region includes a plurality of holes containing a gas, said holes randomly located along an axis of the optical fiber, and wherein cross-sections taken at different points along the axis of the fiber have differing random hole patterns and differing random hole sizes.

48. The optical fiber of claim 47, wherein the holes comprise holes which are no larger in diameter than five microns.

49. The optical fiber of claim 47, wherein the holes contain an inert gas.

50. The optical fiber of claim 47, wherein the holes contain a gas which is at least one of $N_2$, $CO_2$, carbon monoxide, and nitrogen oxides.

51. The optical fiber of claim 50, wherein the gas consists substantially of $N_2$.

52. The optical fiber of claim 50, wherein the gas consists substantially of $CO_2$.

53. The optical fiber of claim 50, wherein the gas consists substantially of carbon monoxide.

54. The optical fiber of claim 50, wherein the gas consists substantially of nitrogen oxides.

55. An optical fiber, comprising:
a core; and
a cladding region surrounding the core, wherein the cladding region includes a plurality of holes containing a gas, wherein the gas consists substantially of an inert gas.

56. An optical fiber, comprising:
a core; and
a cladding region surrounding the core, wherein the cladding region includes a plurality of holes containing a gas, said holes varying in location along the axis of said fiber and said gas consists substantially of an inert gas.

57. The optical fiber of claim 1, wherein the optical fiber comprises a core having a first refractive index and a cladding region having a second refractive index which is lower than said first refractive index.

58. The optical fiber of claim 14, wherein the core has a first refractive index, and wherein the cladding region has a second refractive index which is lower than said first refractive index.

59. The pressure or force sensor of claim 22, wherein the optical fiber comprises a core having a first refractive index and a cladding region having a second refractive index which is lower than said first refractive index.

60. The optical fiber of claim 26, wherein the core has a first refractive index, and wherein the cladding region has a second refractive index which is lower than said first refractive index.

61. The optical fiber of claim 27, wherein the core has a first refractive index, and wherein the cladding region has a second refractive index which is lower than said first refractive index.

62. The optical fiber of claim 28, wherein the core has a first refractive index, and wherein the cladding region has a second refractive index which is lower than said first refractive index.

63. The optical fiber of claim 29, wherein the core has a first refractive index, and wherein the cladding region has a second refractive index which is lower than said first refractive index.

64. The optical fiber of claim 30, wherein the core has a first refractive index, and wherein the cladding region has a second refractive index which is lower than said first refractive index.

65. The optical fiber of claim 31, wherein the core has a first refractive index, and wherein the cladding region has a second refractive index which is lower than said first refractive index.

66. The optical fiber of claim 32, wherein the core has a first refractive index, and wherein the cladding region has a second refractive index which is lower than said first refractive index.

67. The optical fiber of claim 33, wherein the core has a first refractive index, and wherein the cladding region has a second refractive index which is lower than said first refractive index.

68. The optical fiber of claim 34, wherein the core has a first refractive index, and wherein the cladding region has a second refractive index which is lower than said first refractive index.

69. The optical fiber of claim 35, wherein the core has a first refractive index, and wherein the cladding region has a second refractive index which is lower than said first refractive index.

70. The optical fiber of claim 36, wherein the core has a first refractive index, and wherein the cladding region has a second refractive index which is lower than said first refractive index.

71. The method of claim 40, wherein the optical fiber is formed to comprise a core having a first refractive index and a cladding region having a second refractive index which is lower than said first refractive index.

72. The optical fiber of claim 47, wherein the core has a first refractive index, and wherein the cladding region has a second refractive index which is lower than said first refractive index.

73. The optical fiber of claim 49, wherein the core has a first refractive index, and wherein the cladding region has a second refractive index which is lower than said first refractive index.

74. The optical fiber of claim 55, wherein the core has a first refractive index, and wherein the cladding region has a second refractive index which is lower than said first refractive index.

75. The optical fiber of claim 56, wherein the core has a first refractive index, and wherein the cladding region has a second refractive index which is lower than said first refractive index.

* * * * *

INTER PARTES REEXAMINATION CERTIFICATE (0311th)
United States Patent
Pickrell et al.

(10) Number: US 7,567,742 C1
(45) Certificate Issued: Oct. 11, 2011

(54) HOLEY OPTICAL FIBER WITH RANDOM PATTERN OF HOLES AND METHOD FOR MAKING SAME

(75) Inventors: Gary Pickrell, Blacksburg, VA (US); Daniel Kominsky, Blacksburg, VA (US); Roger Stolen, Blacksburg, VA (US); Jeong I. Kim, Suwon (KR); Anbo Wang, Blacksburg, VA (US); Ahmad Safaai-Jazi, Blacksburg, VA (US)

(73) Assignee: The United States of America as represented by the Secretary of the Air Force, Washington, DC (US)

Reexamination Request:
No. 95/001,215, Jul. 28, 2009

Reexamination Certificate for:
Patent No.: 7,567,742
Issued: Jul. 28, 2009
Appl. No.: 11/929,058
Filed: Oct. 30, 2007

Related U.S. Application Data (63) Continuation of application No. 10/863,805, filed on Jun. 9, 2004, now Pat. No. 7,444,838.
(60) Provisional application No. 60/515,447, filed on Oct. 30, 2003.

(51) Int. Cl.
*G02B 6/32* (2006.01)
*C03B 37/023* (2006.01)
*G01J 1/04* (2006.01)

(52) U.S. Cl. ............. 385/125; 250/227.11; 250/227.14; 385/12; 385/123; 385/13; 385/141; 65/385; 65/401

(58) Field of Classification Search .................. None
See application file for complete search history.

(56) References Cited

U.S. PATENT DOCUMENTS

| | | | |
|---|---|---|---|
| 2,261,022 A | 10/1941 | Fox et al. | 65/22 |
| 2,978,340 A | 4/1961 | Veatch et al. | 65/22 |
| 4,038,063 A | 7/1977 | Williams et al. | 65/22 |
| 5,627,921 A | 5/1997 | Lidgard et al. | |
| 5,745,611 A | 4/1998 | Komachiya et al. | |
| 5,972,488 A | 10/1999 | Nagata et al. | 428/304.4 |
| 6,418,258 B1 | 7/2002 | Wang | |
| 2002/0197039 A1 | 12/2002 | Carter et al. | |
| 2003/0097857 A1 | 5/2003 | Oei | 65/20 |

OTHER PUBLICATIONS

Record info of Novel Techniques for the Fabrication of Holey Fibers. Proceedings of SPIE vol. 4578. Feb. 2002.*
Pickrell et al., "Novel Techniques for the Fabrication of Holey Optical Fibers," *Proc. SPIE* 4578:271-82 (2002).

\* cited by examiner

*Primary Examiner* — Deandra Hughes (57) ABSTRACT

A random array of holes is created in an optical fiber by gas generated during fiber drawing. The gas forms bubbles which are drawn into long, microscopic holes. The gas is created by a gas generating material such as silicon nitride. Silicon nitride oxidizes to produce nitrogen oxides when heated. The gas generating material can alternatively be silicon carbide or other nitrides or carbides. The random holes can provide cladding for optical confinement when located around a fiber core. The random holes can also be present in the fiber core. The fibers can be made of silica. The present random hole fibers are particularly useful as pressure sensors since they experience a large wavelength dependant increase in optical loss when pressure or force is applied.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 28-30, 33-35, 43-45, 52-54, 62-64 and 67-69 is confirmed.

Claims 1-27, 31, 32, 36-42, 46-51, 55-61, 65, 66 and 70-75 are cancelled.

\* \* \* \* \*